US008183980B2

(12) United States Patent  
Davis et al.

(10) Patent No.: US 8,183,980 B2
(45) Date of Patent: May 22, 2012

(54) DEVICE AUTHENTICATION USING A UNIDIRECTIONAL PROTOCOL

(75) Inventors: Michael L. Davis, Amherst, NY (US); Tam Hulusi, Santa Ana, CA (US)

(73) Assignee: Assa Abloy AB (SE)

( * ) Notice: Subject to any disclaimer, the term of this patent is extended or adjusted under 35 U.S.C. 154(b) by 1389 days.

(21) Appl. No.: 11/464,912

(22) Filed: Aug. 16, 2006

(65) Prior Publication Data

US 2007/0046424 A1 Mar. 1, 2007

Related U.S. Application Data

(60) Provisional application No. 60/713,528, filed on Aug. 31, 2005.

(51) Int. Cl.
*G05B 23/00* (2006.01)
(52) U.S. Cl. ........................................ 340/5.8
(58) Field of Classification Search .................. 340/5.8, 340/10.1, 4.61, 5.2, 5.9
See application file for complete search history.

(56) References Cited

U.S. PATENT DOCUMENTS

| | | | |
|---|---|---|---|
| 3,694,757 A | 9/1972 | Hanna, Jr. | |
| 4,087,626 A | 5/1978 | Brader | |
| 5,187,676 A | 2/1993 | DeVane | |
| 5,193,115 A | 3/1993 | Vobach | |
| 5,258,936 A | 11/1993 | Gallup et al. | |
| 5,357,528 A | 10/1994 | Alon et al. | |
| 5,420,928 A | 5/1995 | Aiello et al. | |
| 5,446,683 A | 8/1995 | Mullen et al. | |
| 5,533,128 A | 7/1996 | Vobach | |
| 5,541,996 A | 7/1996 | Ridenour | |
| 5,577,124 A | 11/1996 | Anshel et al. | |
| 5,600,324 A * | 2/1997 | Reed et al. | 341/176 |
| 5,608,801 A | 3/1997 | Aiello et al. | |
| 5,680,131 A | 10/1997 | Utz | |
| 5,686,904 A | 11/1997 | Bruwer | |
| 5,696,909 A * | 12/1997 | Wallner | 705/44 |
| 5,751,808 A | 5/1998 | Anshel et al. | |
| 5,754,603 A | 5/1998 | Thomas et al. | |
| 5,802,176 A | 9/1998 | Audebert | |
| 5,825,882 A | 10/1998 | Kowalski et al. | |
| 5,844,990 A * | 12/1998 | Kokubu et al. | 380/262 |
| 6,044,388 A | 3/2000 | DeBellis et al. | |
| 6,052,786 A | 4/2000 | Tsuchida | |
| 6,078,888 A * | 6/2000 | Johnson, Jr. | 705/50 |
| 6,079,018 A | 6/2000 | Hardy et al. | |
| 6,097,307 A | 8/2000 | Utz | |

(Continued)

FOREIGN PATENT DOCUMENTS

AU 2006203768 3/2007

(Continued)

OTHER PUBLICATIONS

Partial European Search Report for EP Application No. 06 11 9388, Jan. 10, 2007, 4 pages.

(Continued)

*Primary Examiner* — Vernal Brown
(74) *Attorney, Agent, or Firm* — Sheridan Ross P.C.

(57) ABSTRACT

Secure access systems are discussed herein. Specifically, a method and system is provided that allows a control panel of a secure access system to verify the authenticity and fidelity of a reader within the secure access system by utilizing a rolling code agreed upon by the reader and the control panel.

46 Claims, 7 Drawing Sheets

U.S. PATENT DOCUMENTS

| | | | |
|---|---|---|---|
| 6,154,544 A | 11/2000 | Farris et al. | |
| 6,181,252 B1* | 1/2001 | Nakano | 340/5.26 |
| 6,249,866 B1* | 6/2001 | Brundrett et al. | 713/165 |
| 6,285,761 B1 | 9/2001 | Patel et al. | |
| 6,314,440 B1 | 11/2001 | O'Toole et al. | |
| 6,411,199 B1* | 6/2002 | Geiszler et al. | 340/10.1 |
| 6,487,176 B1 | 11/2002 | Lehmann | |
| 6,542,608 B2 | 4/2003 | Scheidt et al. | |
| 6,606,386 B2 | 8/2003 | Scheidt et al. | |
| 6,608,901 B2 | 8/2003 | Scheidt et al. | |
| 6,691,141 B2 | 2/2004 | Schmidt | |
| 6,718,038 B1 | 4/2004 | Cusmario | |
| 6,724,296 B1* | 4/2004 | Hikita et al. | 340/5.61 |
| 6,810,123 B2 | 10/2004 | Farris et al. | |
| 6,885,747 B1 | 4/2005 | Scheidt et al. | |
| 6,931,533 B2 | 8/2005 | Roberts | |
| 6,947,560 B1 | 9/2005 | Smeets et al. | |
| 6,988,203 B2 | 1/2006 | Davis | |
| 7,016,925 B2 | 3/2006 | Schmidt | |
| 7,064,665 B2 | 6/2006 | Woodall et al. | |
| 7,085,791 B2 | 8/2006 | Barry et al. | |
| 7,120,696 B1 | 10/2006 | Au et al. | |
| 7,170,997 B2 | 1/2007 | Petersen et al. | |
| 7,190,787 B1 | 3/2007 | Graunke et al. | |
| 7,212,632 B2 | 5/2007 | Scheidt et | |
| 7,219,113 B2 | 5/2007 | Bonaccio et al. | |
| 7,277,543 B1 | 10/2007 | Driscoll | |
| 2001/0041593 A1 | 11/2001 | Asada | |
| 2001/0056534 A1 | 12/2001 | Roberts | |
| 2002/0016913 A1 | 2/2002 | Wheeler et al. | |
| 2002/0174357 A1 | 11/2002 | Davis et al. | |
| 2002/0184539 A1 | 12/2002 | Fukuda et al. | |
| 2002/0191794 A1 | 12/2002 | Farris et al. | |
| 2003/0014646 A1 | 1/2003 | Buddhikot et al. | |
| 2003/0074319 A1 | 4/2003 | Jaquette | |
| 2003/0118187 A1 | 6/2003 | Fitzgibbon | |
| 2003/0200446 A1 | 10/2003 | Siegel et al. | |
| 2003/0204541 A1 | 10/2003 | Shackleford et al. | |
| 2003/0208697 A1 | 11/2003 | Gardner | |
| 2004/0066936 A1 | 4/2004 | Farris et al. | |
| 2004/0153291 A1 | 8/2004 | Kocarev et al. | |
| 2004/0162863 A1 | 8/2004 | Barry et al. | |
| 2004/0162864 A1 | 8/2004 | Nowshadi et al. | |
| 2004/0243813 A1 | 12/2004 | Farris et al. | |
| 2005/0002533 A1 | 1/2005 | Langin-Hooper et al. | |
| 2005/0010624 A1 | 1/2005 | Stehle | |
| 2005/0044119 A1 | 2/2005 | Langin-Hooper et al. | |
| 2005/0082365 A1 | 4/2005 | Merkert | |
| 2005/0110210 A1 | 5/2005 | Soltys et al. | |
| 2005/0129247 A1 | 6/2005 | Gammel et al. | |
| 2005/0166040 A1 | 7/2005 | Walmsley | |
| 2005/0182946 A1 | 8/2005 | Shatford | |
| 2005/0265546 A1 | 12/2005 | Suzuki | |
| 2006/0023742 A1 | 2/2006 | Cheng et al. | |
| 2006/0083228 A1 | 4/2006 | Ong et al. | |
| 2006/0123466 A1 | 6/2006 | Davis et al. | |
| 2006/0174184 A1 | 8/2006 | Stroud et al. | |
| 2006/0177056 A1 | 8/2006 | Rostin et al. | |
| 2006/0179064 A1 | 8/2006 | Onaya et al. | |
| 2006/0206554 A1 | 9/2006 | Lauter et al. | |
| 2006/0294312 A1 | 12/2006 | Walmsley | |
| 2007/0016942 A1 | 1/2007 | Sakai et al. | |
| 2007/0034691 A1 | 2/2007 | Davis et al. | |
| 2007/0043954 A1 | 2/2007 | Fox | |
| 2007/0057057 A1 | 3/2007 | Andresky et al. | |
| 2007/0076864 A1 | 4/2007 | Hwang | |
| 2007/0099597 A1 | 5/2007 | Arkko et al. | |
| 2007/0109101 A1* | 5/2007 | Colby | 340/10.4 |
| 2007/0121943 A1 | 5/2007 | Dellow et al. | |
| 2007/0165847 A1 | 7/2007 | Langin-Hooper et al. | |
| 2007/0165848 A1 | 7/2007 | Reyes | |
| 2007/0178886 A1 | 8/2007 | Wang et al. | |
| 2007/0183593 A1 | 8/2007 | Yoshida et al. | |
| 2007/0195952 A1 | 8/2007 | Singanamala | |
| 2007/0214293 A1 | 9/2007 | Gangstoe et al. | |
| 2007/0269048 A1 | 11/2007 | Hsu | |
| 2007/0293192 A9 | 12/2007 | De Groot | |
| 2007/0294528 A1 | 12/2007 | Shoji et al. | |
| 2007/0294531 A1 | 12/2007 | Alten | |
| 2007/0294539 A1 | 12/2007 | Shulman et al. | |
| 2007/0296817 A1 | 12/2007 | Ebrahimi et al. | |
| 2008/0001778 A1 | 1/2008 | Challener et al. | |
| 2008/0005532 A1 | 1/2008 | Liao et al. | |
| 2008/0010218 A1 | 1/2008 | Zank | |
| 2008/0012690 A1 | 1/2008 | Friedrich | |
| 2008/0016363 A1 | 1/2008 | Lapstun et al. | |
| 2008/0046493 A1 | 2/2008 | Rosenberg | |
| 2008/0061941 A1 | 3/2008 | Fischer et al. | |
| 2008/0184349 A1 | 7/2008 | Ting | |

FOREIGN PATENT DOCUMENTS

| | | |
|---|---|---|
| CA | 2556843 | 2/2007 |
| EP | 0616429 | 9/1994 |
| EP | 0697491 | 2/1996 |
| EP | 0843438 | 5/1998 |
| EP | 0872976 | 10/1998 |
| EP | 0924894 | 6/1999 |
| EP | 0949563 | 10/1999 |
| EP | 0996928 | 5/2000 |
| EP | 1148644 | 10/2001 |
| EP | 1292882 | 3/2003 |
| EP | 1398691 | 3/2004 |
| EP | 1420542 | 5/2004 |
| EP | 1460573 | 9/2004 |
| EP | 1643643 | 4/2006 |
| EP | 1696360 | 8/2006 |
| EP | 1043687 | 11/2006 |
| EP | 1760985 | 3/2007 |
| WO | WO 01/13218 | 2/2001 |
| WO | 01/18331 A1 | 3/2001 |
| WO | WO 02/082367 | 10/2002 |
| WO | WO 03/027832 | 4/2003 |
| WO | WO 03/042812 | 5/2003 |
| WO | WO2004010373 | 1/2004 |
| WO | 2004/039119 A1 | 5/2004 |
| WO | 2004039119 A1 | 5/2004 |
| WO | WO2005001777 | 1/2005 |
| WO | 2005/018137 | 2/2005 |
| WO | 2005018137 A1 | 2/2005 |
| WO | WO 2005/029315 | 3/2005 |
| WO | WO2005/038729 | 4/2005 |
| WO | WO2005038729 | 4/2005 |
| WO | WO 2006/015625 | 2/2006 |
| WO | WO 2006/032941 | 3/2006 |
| WO | WO 2006/036521 | 4/2006 |
| WO | WO 2006/126668 | 11/2006 |
| WO | WO 2007/103906 | 9/2007 |
| WO | WO 2007/117315 | 10/2007 |
| WO | WO 2007/120215 | 10/2007 |
| WO | WO 2008/001918 | 1/2008 |
| WO | WO 2008/010441 | 1/2008 |
| WO | WO 2008/043125 | 4/2008 |

OTHER PUBLICATIONS

Glass, DMCA Used in Garage Door Battle, Ziff Davis Media, retrieved from http://www.extremetech.com/print_article2/0,2533 on May 19, 2005, Jan. 23, 2003, 1 page.

Weinstein, DMCA: Ma Bell Would Be Proud, Wired News, Jan. 20, 2003, 27 pages.

Brian, Howstuffworks—How Remote Entry Works, Howstuffworks.com, retrieved from http://auto.howstuffworks.com/remote-entry.htm/printable on May 19, 2005, copyright 2005, 8 pages.

Knebelkamp et al., Latest Generation Technology for Immobilizer Systems, Texas Instruments, retrieved from www.ti.com/tiris on May 19, 2005, 11 pages.

Texas Instruments, RFID Press Release RFID based immobilizer systems help to curb auto theft and reduce insurance costs, May 7, 1999, 2 pages.

Security Industry Association, Access Control Standards for the 26-Bit Wiegand Reader Interface, Oct. 17, 1996, 15 pages.

Smart Card Alliance, Contactless Technology for Secure Physical Access: Technology and Standards, Oct. 2002, 36 pages.

INCITS, Information Technology: Application Profile for Commercial Biometrical Physical Access Control, INCITS m1-05-0031, 2005, 16 pages.

CONDOPLEX, Condoplex—The World Leader in Developing Security and Communication Solutions, retrieved from http://web.archive.org/web/20040324112641/http://condoplexinc.com/, publication date Mar. 24, 2004, 1 page.

Essex Electronics Incorporated, "26Bit Weigand Specifications," Apr. 1, 1998, 1 page, U.S.A.

HID Corporation, "Technology Basics: Understanding Wiegand" 2004, 5 pages, U.S.A.

IB Technology, "Micro RWD EM4001 'Mag swipe' Decimal Output Version" May 3, 2005, 9 pages, United Kingdom.

Davis, Reader to Panel Authentication, Cartes 2005, Paris, France, Nov. 1, 2005, 33 pp.

U.S. Appl. No. 12/539,431, filed Aug. 11, 2009, Davis et al.

Written Opinion of the International Searching Authority for International (PCT) Patent Application No. PCT/US2009/053430 mailed Nov. 24, 2009.

International Search Report for International (PCT) Patent Application No. PCT/US2009/053430 mailed Nov. 24, 2009.

Examiner's First Report for Australian Patent Application No. 2006203768, mailed Nov. 20, 2009.

Anashin, V. "Uniformly distributed sequences over p-adic integers," Number Theoretic and Algebraic Methods in Computer Science, Moscow 1993 (A.J. van der Poorten, I.Shparlinski, and H.G. Zimmer eds., 1995), pp. 1-18, available at http://crypto.rsuh.ru/papers/anashin-paper1.pdf.

Anashin, V., "Pseudorandom number generation by p-adic ergodic transformations" (Jan. 29, 2004), available at http://arxiv.org/abs/cs.CR/0401030.

Anashin "Non-Archimedean Ergodoci Theory and Pseudorandom Generators," Oct. 7, 2007, 39 pages, available at http://arxiv.org/abs/0710.1418v1.

Barker, Cryptanalysis of Shift-Register Generated Stream Cipher Systems, Cryptographic Series No. 39, Aegean Park Press, 1984, Chapters 1-3, pp. 1-38.

Blum, M. et al., "How to Generate Cryptographically Strong Sequences of Pseudo-Random Bits," SIAM Journal on Computing, Nov. 1984, vol. 13, No. 4, pp. 850-864.

Koblitz, N., p-Adic Number, p-Adic Analysis and Zeta Functions, Chapter 3, Building up $\Omega$, Springer, New York, (1977), pp. 52-74.

Kuipers, et al., Uniform Distribution of Sequences, John Wiley & Sons (1974), 400 pages (Submitted in 3 Parts).

Luby, M., Pseudorandomness and Cryptographic Applications, Princeton University Press (1996), pp. ix-55.

International Preliminary Report on Patentability for International (PCT) Patent Application No. PCT/US09/53430, mailed Feb. 24, 2011.

Anashin, V., "Pseudorandom number generation by p-adic ergodic transformations: An addendum" (Feb. 26, 2004), pp. 1-9, available at http://arxiv.org/abs/cs.CR/0402060.

Anashin, V., "Uniformly distributed sequences in computer algebra, or how to constuct program generators of random numbers," J. Math. Sci., 89(4):1355-1390 (1998), available at http://crypto.rsuh.ru/papers/anashin-paper5.pdf.

Anashin, V., "Uniformly distributed sequences of p-adic integers," II. Discrete Math. Appl., 12(6):527-590 (2002), available at http://arXiv.org/abs/math.NT/0209407.

Anashin, V., "Uniformly distributed sequences of p-adic integers," Mathematical Notes, 55(2):109-133 (1994), available at http://crypto.rsuh.ru/papers/anashin-paper2.pdf.

Damgard, I., "On the Randomness of Legendre and Jacobi Sequences," Advances in Cryptology (Proceedings of Crypto '88), Lecture Notes in Computer Science (1990), pp. 163-172.

Levin, L., "One Way Functions and Pseudorandom Generators," Combinatorica, vol. 7(4) (1987), pp. 357-363.

Woodcock, F., et al., "p-Adic Chaos and Random Number Generation," Experimental Mathematics, vol. 7(4), (1998), pp. 334-342.

European Search Report and Opinion for European Patent Application No. EP09807178, dated Nov. 8, 2011 6 pages.

Official Action for U.S. Appl. No. 12/539,431, mailed Jan. 26, 2012 7 pages.

* cited by examiner

| ROLLING CODE | REQUIRED CHECK IN TIME |
| --- | --- |
| A | T |
| B | T + PERIOD |
| C | T + (2 * PERIOD) |
| ⋮ | ⋮ |
| X | T + (k * PERIOD) |

FIG.7

DEVICE AUTHENTICATION USING A UNIDIRECTIONAL PROTOCOL

This application claims benefit of U.S. Provisional Patent Application Ser. No. 60/713,528, filed Aug. 31, 2005, which is herein incorporated by this reference in its entirety.

FIELD OF THE INVENTION

The present invention is generally directed to authentication of a reader in a secure access system. More specifically, the present invention provides a reader signal protocol used to protect and differentiate authorized, authentic readers from non-authorized, non-authentic readers in a secure access system.

BACKGROUND

Limiting or securing access to designated or sensitive areas is an important issue. As such, there is a current focus on technological systems for controlling access to designated areas in both the private and public venues. Such systems must be made highly impervious to attack by those wishing to gain unauthorized access to the secured area.

In access control systems, Radio Frequency Identification Devices (RFIDs) or other security credentials are typically used to store data that uniquely identify a holder of the RFID device or the holder's access authorizations. In order to gain access to an asset, such as a building, room, safe, computer, files, information, etc., a holder presents the RFID device to a reader that reads the data and subsequently transmits the data to a panel, processor, or a host system where a decision is made to either grant access to the subject asset or not. There are also readers that combine the functionality of a panel/host and the physical reader into a single unit that makes the access decision. This type of device is sometimes referred to as a stand-alone reader.

Attention has been focused on the security mechanisms employed by RFID cards to protect and secure the data exchange between the RFID device and the reader. Some of these techniques include the use of cryptography, mutual key authentication, secure channels, and even protection of the chip on the RFID device against physical and electrical attacks. However, little attention has been given to ensuring the integrity of the communications between the reader and its host/control panel as well as insuring the integrity of the reader itself.

A working assumption thus far has been that RFID device readers are trustworthy devices, when in fact this may not be the case. In many building access control applications, a reader is mounted on the unsecured side of a door in a location that is not under continuous scrutiny. In such a case, compromise of a single reader could result in a compromise of RFID device security if any secret information, such as keys, authorization codes and the like, were somehow extracted from the reader.

In addition, without knowing the authenticity of the reader an unauthorized or rogue reader could be used to replace an existing legitimate reader in a security system. This rogue reader can actually be any reader or data reply device capable of outputting data in the same format as the replaced reader.

In the access control industry, one of the most popular communication protocols used between a reader and a panel is the Wiegand protocol. Due to its popularity, the Wiegand protocol has become a de-facto industry standard. It is estimated that the majority of today's access control panels support the Wiegand protocol as the primary method to connect readers to the panel. It should be noted that several companies use their own proprietary communications protocols, but they still support the Wiegand protocol due to its popularity and widespread use. Because of this, a variety of non-RFID machine readable ID readers and other devices have standardized on the Wiegand protocol. Examples of these readers support smart card, proximity, magnetic stripe, bar code, barium ferrite, etc. There are also keypads, biometric devices, wireless Wiegand protocol extenders, protocol converters, and even robots that utilize the Wiegand protocol. The Security Industry Association (SIA) also recognizes the Wiegand protocol as an important standard in the access control industry. The Wiegand protocol has become so important that it has been published as an industry standard.

The Wiegand protocol is essentially a unidirectional protocol that only provides for data transmission from a reader to an upstream device (e.g., a control panel, host, or processor). Although there is a signal sent back from the upstream device to the reader, this signal is essentially a logic signal used to convey status to a cardholder by controlling a reader's LED. A superset of the Wiegand protocol adds additional logic signals to control an audible device in the reader and provides for additional reader LED colors. These are not bi-directional protocols because substantive data is still sent in only one direction. The host cannot give the reader a command. Only simple signals are sent from the host to the reader.

As popular as the Wiegand protocol has become, it has shortcomings. Examples of these shortcomings include the fact that the Wiegand protocol is susceptible to electrical noise, has distance limitations, and only allows data to be sent from a reader to an upstream device. Without bidirectional capabilities, it is very difficult to implement a modern protocol that provides for reader authentication.

Another issues is that the Wiegand protocol allows "party line" connections so that it is very easy to connect one or more additional devices to communication wires to monitor the communications between a card reader and a host in an attempt to harvest data streams to be used to compromise the system. Once a rogue device has been connected to monitor communications between the reader and control panel, an attacker could merely note when the door has been unlocked and flag the most recent data stream as one that will open the door. Then, whenever illicit entry is desired, the attacker could just "replay" that data stream causing the door to unlock. The attacker need not even remove the device from the communication wires because the Wiegand communications utilize an "open collector" electrical interface, which allows both the monitoring of messages and generation of messages from that same connection.

There is typically little stopping an attacker from harvesting one or more valid messages to gain illicit entry using different cardholder's data so that no suspicions are aroused. Accessibility to the Wiegand communications wires is increased by the fact that a reader is typically located on the unsecured side of a wall or door and, because of the nature of access control, may be at a location that is not under continuous observation or scrutiny. Making matters worse, many access control readers do not employ a tamper mechanism so that the removal of a reader to access the internal wiring or even to replace the reader with another compromised reader or illicit Wiegand generating device is undetectable.

There have been some attempts to address the shortcomings of the Wiegand protocol. One example of an extension to the Wiegand protocol is described in U.S. Pat. No. 6,988,203 to Davis et al., the contents of which are hereby incorporated herein by this reference. The '203 patent describes appending additional bits to the Wiegand data stream. This provides supplementary information from the reader to the upstream device as well as a CRC or other type of error detection and/or correction bits covering all of the data in the transmission. The '203 patent further describes transmitting data back to the reader from the upstream device via an LED control line.

Additionally, in PCT Application No. WO 2005/038729 to Merkert, which is herein incorporated by this reference, an access system that includes a signal generator located between a reader and a control panel is described. The reader utilizes a dynamic timing element that ensures a replay attack cannot be used to gain unauthorized access to an asset. The reader stamps any signal sent therefrom with a time stamp indicating when the message was generated. Then the control panel reads the time stamp to ensure that the message is authentic. An attempt to harvest a signal and resubmit that signal again at a later time will result in the control panel determining the signal is invalid. To ensure channel security between system elements, encryption and/or digital signatures are used. Unfortunately, this solution does not overcome most of the Wiegand deficiencies.

For instance, there is no way in the currently existing solutions that allows the control panel to continually monitor each reader in order to verify the fidelity of each reader. Thus, leaving open the possibility of having a valid reader replaced with a rogue reader without the system or system operator becoming aware of such actions.

SUMMARY

The present invention is generally directed toward a method, apparatus, and system that allows for authentication of readers in a secure access system. Although well suited for use in an access system utilizing the Wiegand protocol, embodiments of the present invention may be suitable for use in any system utilizing a unidirectional protocol.

In accordance with embodiments of the present invention, a method of checking authenticity of devices in a secure access system utilizing a unidirectional communication protocol is provided. The method comprises the steps of reading a credential with a reader, the reader generating a first message that includes credential data associated with the credential and a first code, transmitting the first message to an upstream device, and the upstream device analyzing the credential data in order to determine the authenticity of the credential and further analyzing the first code in order to determine the authenticity of the reader.

A valid reader employing the above-described method will be able to verify its authenticity to the upstream device by sending a valid code. A reader that is not enabled to generate a valid code may be identified by the upstream device as defective and/or fraudulent. By requiring the reader to send a valid code along with credential data, the upstream device can be confident that the reader is valid and has not been tampered with.

In accordance with further embodiments of the present invention, a method of maintaining a secure access system that utilizes a unidirectional communication protocol is provided. The method comprises the steps of providing a downstream device that is operable to transmit a valid rolling code as a part of a message and further providing an upstream device that is operable to receive the message and analyze the rolling code. The method can continue by determining a required first time of check in and requiring the downstream device to transmit a first message including a first valid rolling code at a first time related to the required time of check in. The method may then determine a required second time of check in that is after the required first time of check in, and require the downstream device to transmit a second message including a second valid rolling code at a second time related to the required second time of check in.

By requiring a downstream device to check in with the upstream device at a particular time schedule, the upstream device can continually update the state of the system. In other words, the upstream device can determine fairly quickly, depending on the amount of time between required check in times, whether a downstream device has been tampered with, replaced, and/or is malfunctioning. If the time between required check in messages is very short, like one second or less, it becomes very difficult for an attacker to perform any action that would interrupt communications between the upstream device and the downstream device.

In one embodiment of the present invention, certain thresholds may be set at the upstream device that allows for missed messages due to noise or the like. For example, a threshold of N missed messages may be allowed for a particular downstream device. Thus, if a downstream device misses one predetermined check in time, it is not necessarily identified as malfunctioning or having been tampered with. Rather, the downstream device is allowed to miss up to N check-ins, which may or may not be consecutive, before an error determination is made.

In accordance with other embodiments of the present invention, a secure access system utilizing a unidirectional communication protocol is provided. The system comprises a credential, a reader that is operable to read credential data from the credential upon presentation of the credential to the reader, generate a message including the credential data and rolling code data, and to transmit the message, and an upstream device that is operable to receive the message and upon receiving the message is operable to analyze the credential data in order to determine the authenticity of the credential and to analyze the rolling code data in order to determine the authenticity of the reader.

In accordance with still further embodiments of the present invention a device adapted for use in a secure access system utilizing a unidirectional communication protocol is provided. The device comprises an input that is adapted to receive a message from a reader, where the message includes a rolling code, an authentication member operable to determine the authenticity of the reader based upon an analysis of the rolling code, and an output operable to transmit the message to an upstream device in response to the authentication member determining the authenticity of the reader is valid.

The device may be an intermediate device that is used only to monitor the authenticity of readers in a given system. The intermediate device may also be adapted to analyze credential data received from the reader in order to make a determination about the authenticity of a credential that was presented to the reader. The intermediate device may be employed in order to ensure that communications between a rogue reader and a control panel do not occur, thus protecting the control panel from potentially harmful signals. This provides a provision for updating legacy systems with embodiments of the present invention without requiring the replacement of a reader or host.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

BRIEF DESCRIPTION OF THE DRAWINGS

FIG. 7 is a block diagram depicting a data structure that can be used by both the upstream and downstream device in order to maintain a secure access system in accordance with embodiments of the present invention.

DETAILED DESCRIPTION

The present invention is generally directed toward a reader authentication method, device, and system. The invention advantageously addresses deficiencies of the prior art and may be utilized within the context of access control or security systems, as well as be equally efficiently utilized in a broad range of other applications using a unidirectional communications protocol where interactive computerized data acquisition techniques are used, both contactless or requiring a physical contact with a carrier of pre-programmed information (e.g., monitoring moving objects, tracking inventory, verifying credit cards, and the like).

Figure 1:
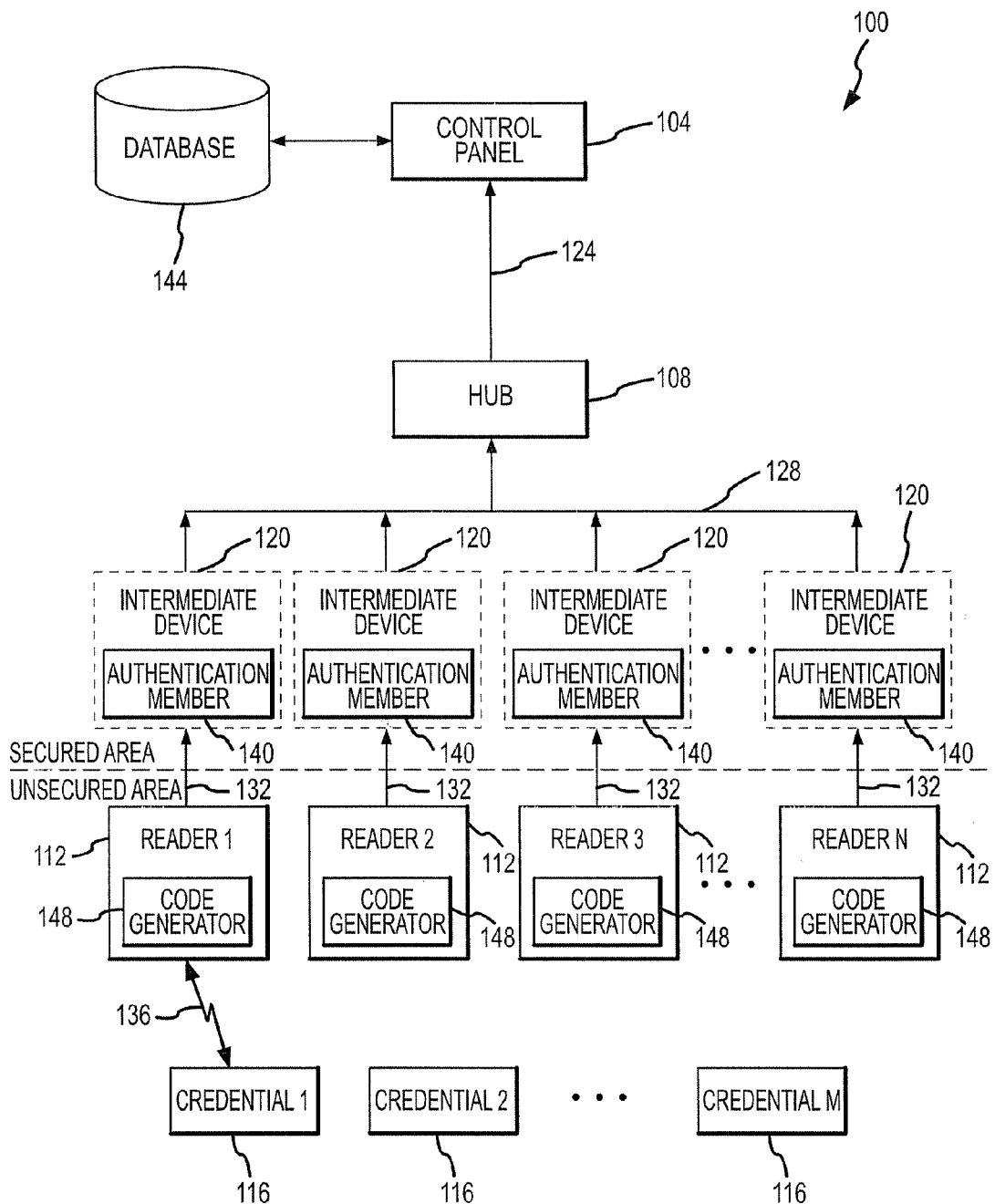
FIG. 1 is a diagram depicting an exemplary system for authenticating credentials with legitimate readers in accordance with embodiments of the present invention.

FIG. 1 depicts an access network 100 used to verify the identity of at least one credential. In one embodiment of the present invention, the system 100 comprises a control panel 104, a hub 108, a plurality of readers 112₁-n, and a plurality of credentials 116₁-m such that n and m are integers wherein n≧1, m≧1, and typically m is greater than n. The plurality of readers 112₁-n may include readers 112 of the same type, as well as readers of different types. For example, a subset of the plurality of readers 112₁-n may be legacy readers (e.g. readers using older transmission protocols). Whereas another subset of the plurality of readers 112₁-n may be new readers utilizing more secure protocols including the protocols described herein.

Additionally, the system 100 may further comprise intermediate devices 120 connected between a reader 112 and the control panel 104. In the depicted embodiment, the readers 112 are coupled to an intermediate device 112 through interface 132. The intermediate devices 120 are coupled to the hub 108 through interface 128 and the hub is coupled to the control panel 104 via interfaces 124. In an alternate embodiment (not shown), the readers 112 may be coupled to the respective inputs/outputs of the control panel 104 without a device, like the hub 108 or intermediate device 120, existing there between. Interfaces 124, 128, and 132 between the readers 112, the intermediate devices 120, the hub 108, and the control panel 104 are generally unidirectional interfaces, which may selectively be implemented in a form of wired, wireless, fiber-optic communication links, or combinations thereof.

As can be appreciated by one of skill in the art, the interfaces 124, 128, and 132 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the control panel 104 and the readers 112 may include one or more of the TCP/IP protocol, RS 232, RS 485, Current Loop, Power of Ethernet (POE), Bluetooth, ZigBee, GSM, WiFi, and other communication methods and protocols known in the art.

An exemplary intermediate device 120 comprises an input that is adapted to receive signals via interface 132, an output that is adapted to transmit signals via interface 128, and an authentication member 140. The authentication member 140 is operable to determine the authenticity of one or more readers 112 associated with the intermediate device 120 (e.g., determine whether the reader 112 is valid or not), based upon a rolling code that is transmitted from the reader 112 to the intermediate device 120.

The control panel 104 may be a general-purpose computer adapted for multi-task data processing and suitable for use in a various settings (e.g. commercial, industrial, residential, and the like). A memory of the control panel 104 comprises software program(s) containing a database of records for the system 100. Alternatively, a database 144 may be separated from the control panel 104. The database 144 whether integral to the control panel 104, separate from the control panel 104, or both, maintains records associated with the readers 112, credentials 116 and their respective holders or users, algorithm(s) for acquiring, decoding, verifying, and modifying data contained in the readers 112, algorithm(s) for testing authenticity and validity of the credentials 116, and algorithm(s) for implementing actions based on the results of these tests. The database 144 may further comprise a list of valid rolling codes and their corresponding required time of check in and/or algorithm(s) for generating valid rolling codes and comparing them with rolling codes received from a downstream device.

As used herein, in reference to an individual or an object associated with a credential 116, the terms a "holder" and a "user" are used interchangeably.

Each reader 112 is adapted for exchanging information with the control panel 104 and for requesting data from the credential 116 placed in the active zone of the reader. The reader 112 may also be adapted for processing at least a portion of the data acquired from the credential 116. Alternatively, processing of the acquired data may be performed using the control panel 104 exclusively. In one embodiment, the reader 112 generates signals facilitating execution of the results of interrogating the credential 116 (e.g., engages/disengages a locking mechanism, allows/disallows movement of a monitored article, temporarily disables itself, activates an alarm system, updates a database, and the like). Alternatively, the control panel 104 may generate such signals.

In accordance with embodiments of the present invention, a stand-alone reader 112 may be utilized to perform the functionality of both the reader 112 and the control panel 104. This stand-alone reader may include, or have access to, the database that contains data used to determine the authenticity of a credential and/or algorithm(s) used to make the determination of authenticity of the credential 116. A determination of authenticity for a credential is made at the receiving point rather than having to transmit data across a network from the reader to a control panel 104 in order to make a determination of authenticity. The stand-alone reader is further operable to execute instructions based upon the analysis of the credential 116.

Specific configurations of the control panel 104 are determined based on and compliant with computing and interfacing capabilities of the readers 112 and/or the hub 108.

At least a portion of the plurality of readers 112 further comprise a code generator 148. The code generator 148 is used by the reader 112 to generate a code, possibly a rolling code, in order to verify its authenticity to an upstream device. The code generator 148 may comprise a table, sequence, or data structure of valid rolling codes that the reader 112 can work through as update signals are generated. The code generator 148 may also comprise a code generating algorithm that creates a valid code based on certain criteria.

Interface 136 represents the communication interface that exists between a reader 112 and a credential 116. Interface 128 may represent an RF communication interface, a biometric communication interface, a keypad, a magnetic communication interface, an optical communication interface, or combinations thereof.

In operation a credential 116, for example a credential, is brought into an active zone of the reader 112 in order to establish the communication interface 136. For a credential, a Radio Frequency (RF) communication interface 136 between the reader 112 and the credential is typically automatically established when the credential is brought within an active zone of a reader/interrogator 112. The active zone of an RF reader 112 is defined as a three dimensional space where the intensity of RF signals emitted by the reader 112 exceeds a threshold of sensitivity of the credential and the intensity of RF signals emitted by the credential exceeds a threshold of sensitivity of the reader 112. When a credential is presented to most readers, such a communication interface 136 is established and the reader 112 and credential begin transmitting data back and forth.

The credential 116 may also be implemented in a number of other machine readable devices including, but not being limited to, contact smart card, a contactless smart card, a proximity card, a magnetic stripe card, a barium ferrite card, a bar code, a Wiegand card, a PDA, a cellular phone and any other type of device used to store and transmit data relating a particular application. The active zone for each type of credential 116 may vary based upon the type of communications used between the reader 112 and the credential 116. For example, a magnetic stripe card is placed in the active zone of the reader 112 when it is swiped through the reader 112. As can be appreciated by one of skill in the art, the interface 128 is created upon presentation of the credential 116 to the reader 112 such that communications between the two is facilitated.

The reader 112 takes the information that it retrieves from the credential 116 and generates a signal to send to the control panel 104. In generating the signal the reader 112 creates a credential part of the signal and a rolling code part of the signal. The code generator 148 is typically operable to generate the code part of the signal. The credential data relates to the credential that was read (e.g., user name, social security number, title, access permissions, key, password, manufacturer ID, site code, customer code, unique ID, etc.) The code data or rolling code data is a number, letter, dataset, and/or identifier chosen from possibly a list of potential rolling codes. The rolling code sent from a valid reader 112 may possibly be a code previously agreed upon by the control panel 104 and reader 112. The reader 112 and control panel 104 may cycle through and agree upon a number of valid rolling codes as time progresses in order to provide a more secure system.

Once the control panel 104 receives the signal from the reader 112, the control panel 104 will analyze the credential data from the signal to determine if the credential 116 is authorized to gain access to the asset associated with the reader 112. Additionally, the control panel 104 will analyze the rolling code portion of the signal to determine if the reader 112 is authorized to send commands and has not been tampered with. In an alternative configuration, the signal is sent from the reader 112 to the intermediate device 120 where the rolling code data is analyzed by the authentication member 140 in order to determine if the reader 112 is still valid and has not been tampered with. The intermediate device 120 then forwards the signal on to the control panel 104 for verification of the credential 116. In still a further configuration, the reader 112 generates a signal containing only the credential data and forwards that signal on to the intermediate device 120. The intermediate device 120 then generates rolling code data and incorporates that into the signal from the reader 112. The intermediate device 120 then forwards the signal on to the control panel 104 for verification of the credential and rolling code data. As can be appreciated, any upstream device within the system 100 may perform the verification of the credential data and/or the rolling code data generated by a downstream device. However, it is advantageous to have the reader 112 verified by a device that resides in a secured area rather than an unsecured area so that the device verifying the authenticity of the reader 112 may not be as easily compromised.

Figure 2:
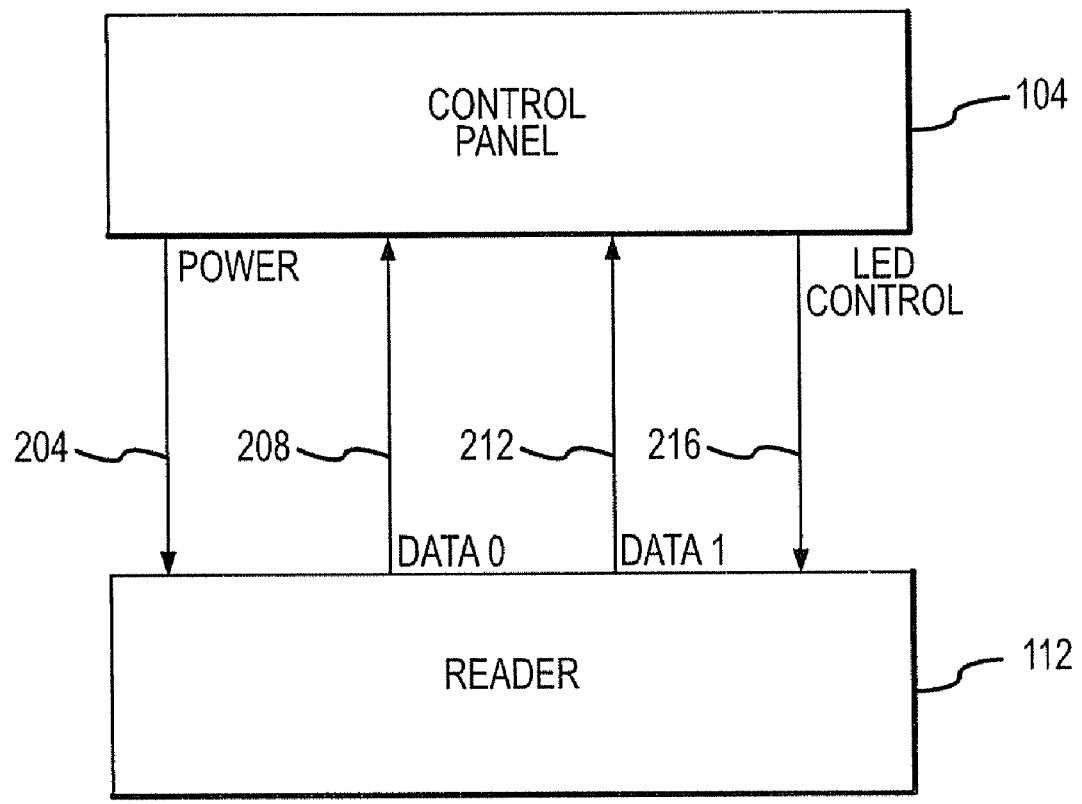
FIG. 2 is a block diagram depicting an exemplary reader and control panel utilizing a unidirectional data transfer protocol in accordance with embodiments of the present invention.

Referring now to FIG. 2 a typical Wiegand protocol reader 112 and control panel 104 will be described. As noted above, the control panel 104 is located in a secure area remote from the Wiegand reader 112. The reader 112 may receive its power from the control panel 104 via the channel 204. The reader 112 is accessible to a user attempting to obtain access to an asset, like the secure area. In order to gain access, a user presents his/her credential (e.g., smart card, RFID tag, magnetic stripe card, bar code card, PDA, cellphone, or the like) to the reader 112. The information received at the reader 112 is transmitted from the reader 112 to the control panel 104 via the data channels 208 and/or 212. The control panel 104 evaluates the information to determine whether the credential is authorized to gain access to an asset associated with reader 112. Depending upon the results of the evaluation, the control panel 104 either performs a valid credential action (e.g., unlocks a door, unlocks a file, turns on a computer, opens a door, etc.) or performs an invalid credential action (e.g., no action, denies access, sounds an alarm, notifies security personnel, etc.) Additionally the control panel 104 may send a signal to the reader 112 via the data channel 216 to flash a light on/off indicating to the credential holder the results of the evaluation. The communications protocol between the control panel 104 and the reader 112 is typically considered unidirectional because most often substantive data is sent from the reader 112 to the control panel 104 and not from the control panel 104 to the reader 112.

Figure 3:
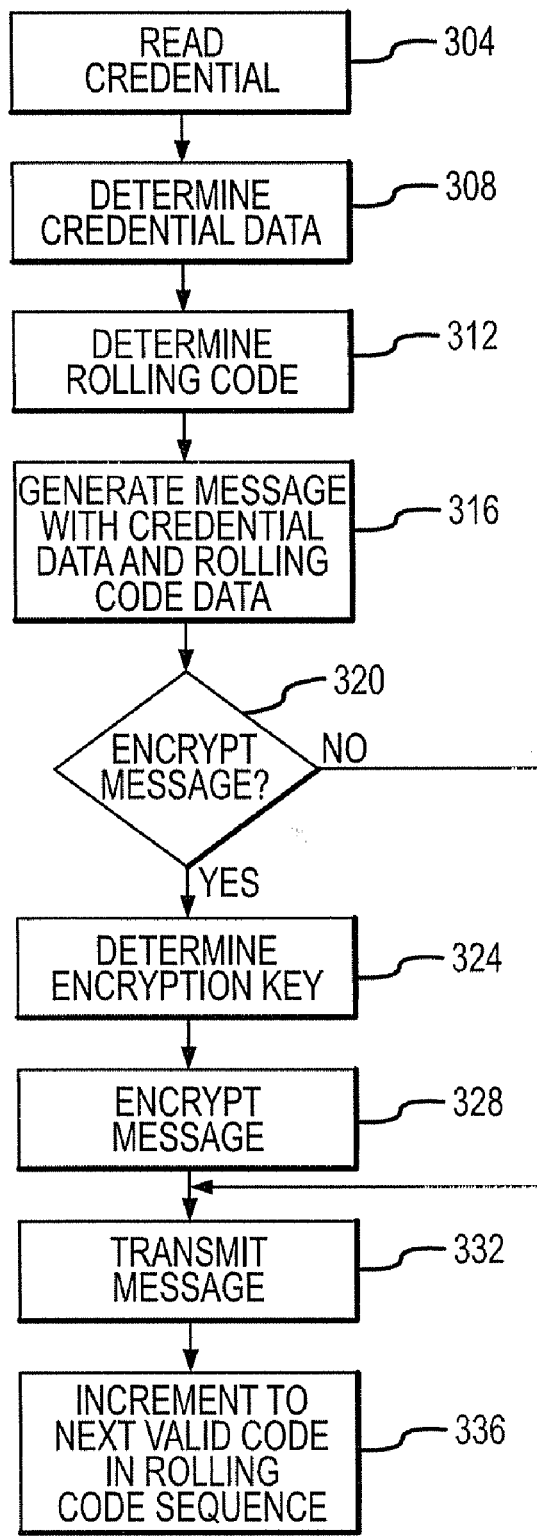
FIG. 3 is a flow chart depicting a method of generating a message for transmission to an upstream device in accordance with embodiments of the present invention.

Referring now to FIG. 3 a method of generating a signal for transmission to an upstream device will be described in accordance with at least some embodiments of the present invention. Initially, the method begins when a credential, like an RFID device, is presented to and read by a reader 112 (step 304). The reader 112 processes the received signal and determines what credential data is contained therein (step 308). Examples of credential data include, user name, social security number, title, access permissions, key, password, manufacturer ID, site code, customer code, and a unique ID. Once the credential data has been determined, a rolling code is determined and generated by the code generator 148 (step 312). A rolling code is generally selected from a list of rolling codes. After a predetermined amount of time the next rolling code from the list of rolling codes is selected by the reader 112. Alternatively, an algorithm for generating a proper code based upon certain criteria may be used. For example, a choosing algorithm for a rolling code may be created based upon the time of day, the number of credentials previously read at a given reader 112, the number of messages transmitted from the reader to the upstream device, a reader unique ID, reader manufacturer identification number, etc. If the reader 112 sends the wrong rolling code, then the control panel 104 will know something is wrong with the reader 112. The reader 112 and control panel 104 generally have their copies of the rolling code (or rolling code selection algorithms) synchronized upon installation. However, as can be appreciated by one of skill in the art, the reader 112 and control panel 104 may have their rolling codes synchronized based upon other known methods.

Alternatively, a valid rolling code may be generated arbitrarily, as long as the control panel 104 is in synchronization with the reader 112 in determining what the next valid code is in a rolling code sequence. For example, the reader 112 may use a pseudo-random code generator and the control panel 104 may use an exact copy of the generator. The system may be initiated such that each generator determines, creates, and agrees upon the same valid rolling code as each continues to operate properly. For example, the reader 112 and the control panel 104 may use a previously agreed upon sequence or list of valid rolling codes. The control panel 104, at any random time, may change the order in which the code generator 148 goes through the list. The control panel 104 could inform the reader 112 to change how it is working through the list with a prompting signal send via an LED control signal, or may do so through an interruption to the power supply of the reader 112. This ensures that the code generator 148 does not necessarily have to go through a finite list of valid rolling codes in the same order until a new list of codes is provided to the code generator 148. Rather, the same list may be used for a relatively longer amount of time and a higher level of security can be maintained.

In an alternative embodiment, data received from the credential 116 may dictate what sequence the rolling code should follow. For example, when a first type of credential 116 is read, the reader 112 may use a first rolling code selection algorithm or select a rolling code from a first list of rolling codes. When a second type of credential 116 is read by the reader 112, the reader may change to a different rolling code selection algorithm and/or list of rolling codes. When the reader 112 switches from one rolling code selection algorithm to another, it should indicate to the upstream device that such a switch has been made. Alternatively, the upstream device may recognize that a second type of credential 116 has been read and automatically knows to switch to a different rolling code selection algorithm.

Of course different algorithms may be used in a similar fashion. The code generator 148 may use a first algorithm to generate valid codes, then upon receiving a prompting signal from an upstream device, like a control panel 104, a different algorithm is used by the code generator 148. Furthermore, data used by the algorithm to compute a valid rolling code may be changed in an analogous way.

Once the rolling code data and credential data have been determined, the reader 112 generates a message containing both the credential data and rolling code data (step 316). In step 320, it is determined if the signal containing the message is to be encrypted. If the signal is not to be encrypted, then the reader 112 transmits the message (step 332). However, if the message is to be encrypted, then an encryption key is determined (step 324). Thereafter, the message is encrypted using the encryption key (step 328). By encrypting the message, the communications between the reader 112 and the control panel 104 becomes more secure. Even if someone is harvesting signals sent from the reader 112 to the control panel 104, they must know the encryption/decryption key and decrypt the message before any substantive information about the message can be determined. Essentially, the encryption of the message makes it more difficult for an attacker to steal a valid rolling code and valid credential data.

In step 332, the message, whether encrypted or not, is transmitted. Then, if the rolling code is based upon the number of sent messages from a particular reader 112, the reader increments to the next rolling code in the valid rolling code sequence (step 336). A valid rolling code may depend on the time of day or the amount of time the reader 112 has been operational. In this case, the rolling code is not necessarily updated after a message is transmitted. In one embodiment, a list of valid rolling codes, for example rolling codes A, B, C, D, and E may be used. The reader 112 starts by appending rolling code A to the first message it generates and transmits to the control panel 104. The next rolling code the reader 112 transmits may be rolling code B, then rolling code C and so on. Once the reader 112 has went through the entire list of rolling codes, it may start over by appending rolling code A to the next message it generates. Alternatively, the reader may append rolling code D after it has appended rolling code E and work through the list of rolling codes that way. As long as the reader 112 follows the predetermined rolling code selection protocol, it will continue to generate valid rolling codes. Using a list of a select nunber of rolling codes provides for an inexpensive implementation of the present invention. However, a persistent attacker may eventually discover the finite list of rolling codes thus jeopardizing the secure access system 100. In order to create a more secure access system, valid rolling codes may be generated based on predetermined algorithms using previously agreed upon criteria.

As can be appreciated by one of skill in the art, the reader 112 is not the only device that may be used to generate a signal containing both rolling code data and credential data. If there are other devices present in an unsecured area, those devices may be required to generate rolling code data in order to guarantee their validity, and the validity of devices connected thereto to the control panel 104. These devices may include credentials 116, intermediate devices 120, and/or any other downstream device.

Figure 4:
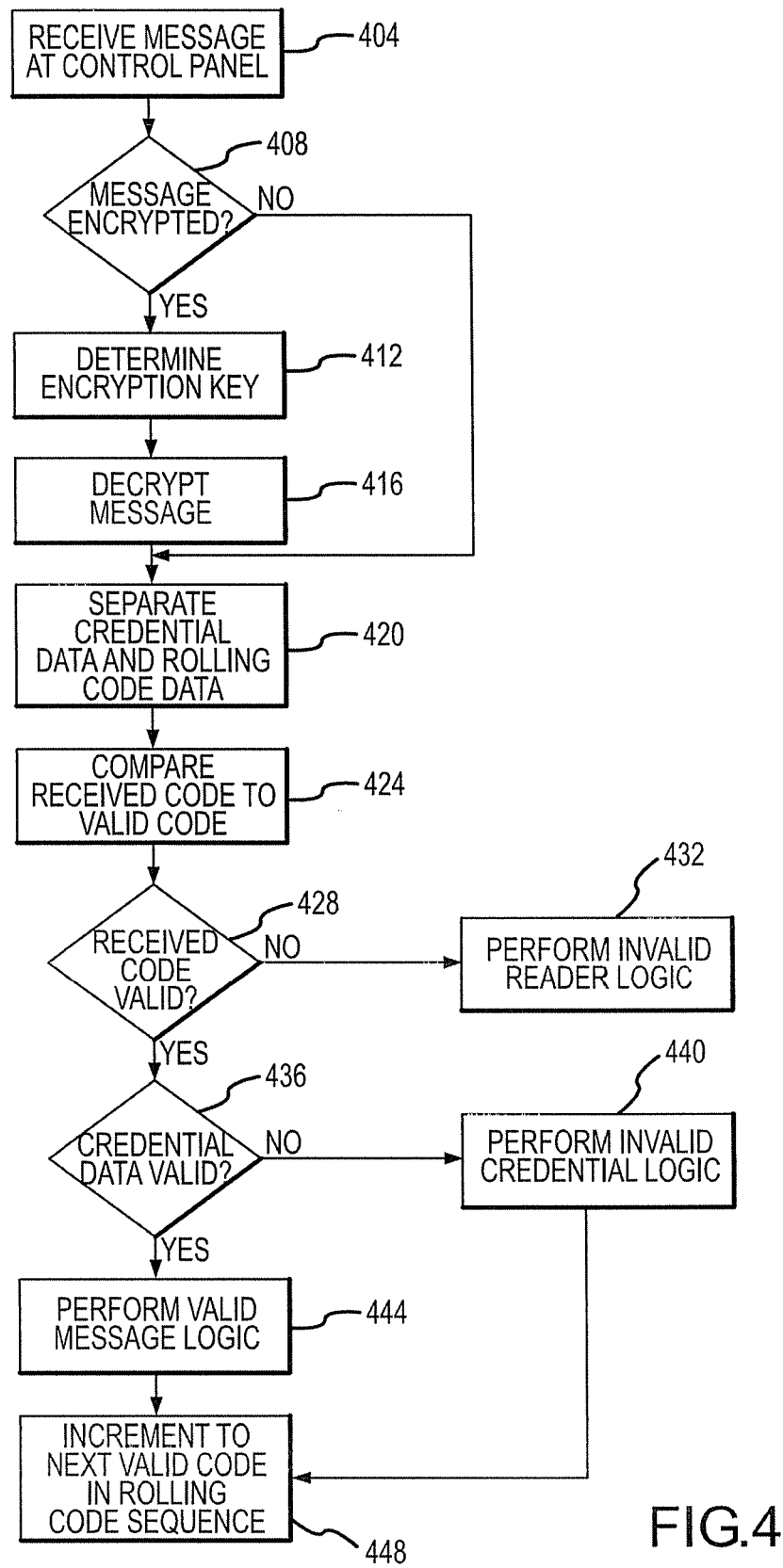
FIG. 4 is a flow chart depicting a method of receiving and processing a message at an upstream device in accordance with embodiments of the present invention.

Referring now to FIG. 4, a method of receiving and processing a signal containing credential and/or rolling code data will be described in accordance with at least some embodiments of the present invention. The method begins when a message is received at an upstream device like a control panel 104 (step 404). The control panel 104 determines if the message has been encrypted, or should have been encrypted at step 408. If the message has been encrypted, then the encryption key is determined (step 412). Using the encryption key, the control panel 104 decrypts the message (step 416). Once the message has been decrypted, or never was encrypted, the reader 112 separates the credential data from the rolling code data (step 420). It is not necessary to separate the credential data from the rolling code data literally. As long as the control panel 104 knows where the credential data ends and the rolling code data starts.

Once the credential data has been separated from the rolling code data, the control panel 104 compares the received rolling code to the required code. The required code may be maintained at the control panel 104 or in the database 144 separate from the control panel 104. In step 428 it is determined if the received code matches the required rolling code. If the received code does not match the required code, then the control panel 104 determines that a valid reader did not generate the signal or a valid reader has been tampered with. In response to determining that there is a problem with the reader 112, the control panel 104 performs invalid reader logic (step 432). An invalid reader logic action may include, sounding an alarm, notifying security/maintenance personnel that a reader is defective, not opening a door, disabling a reader by discontinuing power supply thereto, and other appropriate actions associated with determining that a reader is not valid and as are dictated by the particular circumstances. However, if the reader 112 was valid and did generate a valid rolling code, the credential data is analyzed in step 436. If the credential data is determined to be invalid, then the control panel 104 performs invalid credential logic (step 440). An invalid credential logic action may include actions similar to invalid reader logic actions. Different actions may be taken by the control panel 104 in response to determining that a credential is invalid including, taking no action and/or controlling an LED on the reader notifying the holder of the credential that access has not been granted. However, if the control panel 104 can verify both the rolling code data and credential data, then the control panel 104 performs valid message logic (step 444). A valid message logic action may include opening/unlocking a door, unlocking a computer, disabling an alarm, etc. Then if valid rolling codes are based on a list of rolling codes, the control panel 104 increments to the next valid code in the rolling code sequence (step 448). If the validity of the reader 112 could not be determined in step 428 then the control panel 104 typically does not increment to the next valid code in the rolling code sequence. However, if the reader 112 was valid, but the credential could not be authenticated, then a valid reader 112 will expect to increment to the next code in the rolling code sequence. Because of this, the control panel 104 should also increment to the next code in the rolling code sequence so that the valid reader 112 and control panel 104 continue to agree upon a valid rolling code.

Figure 5:
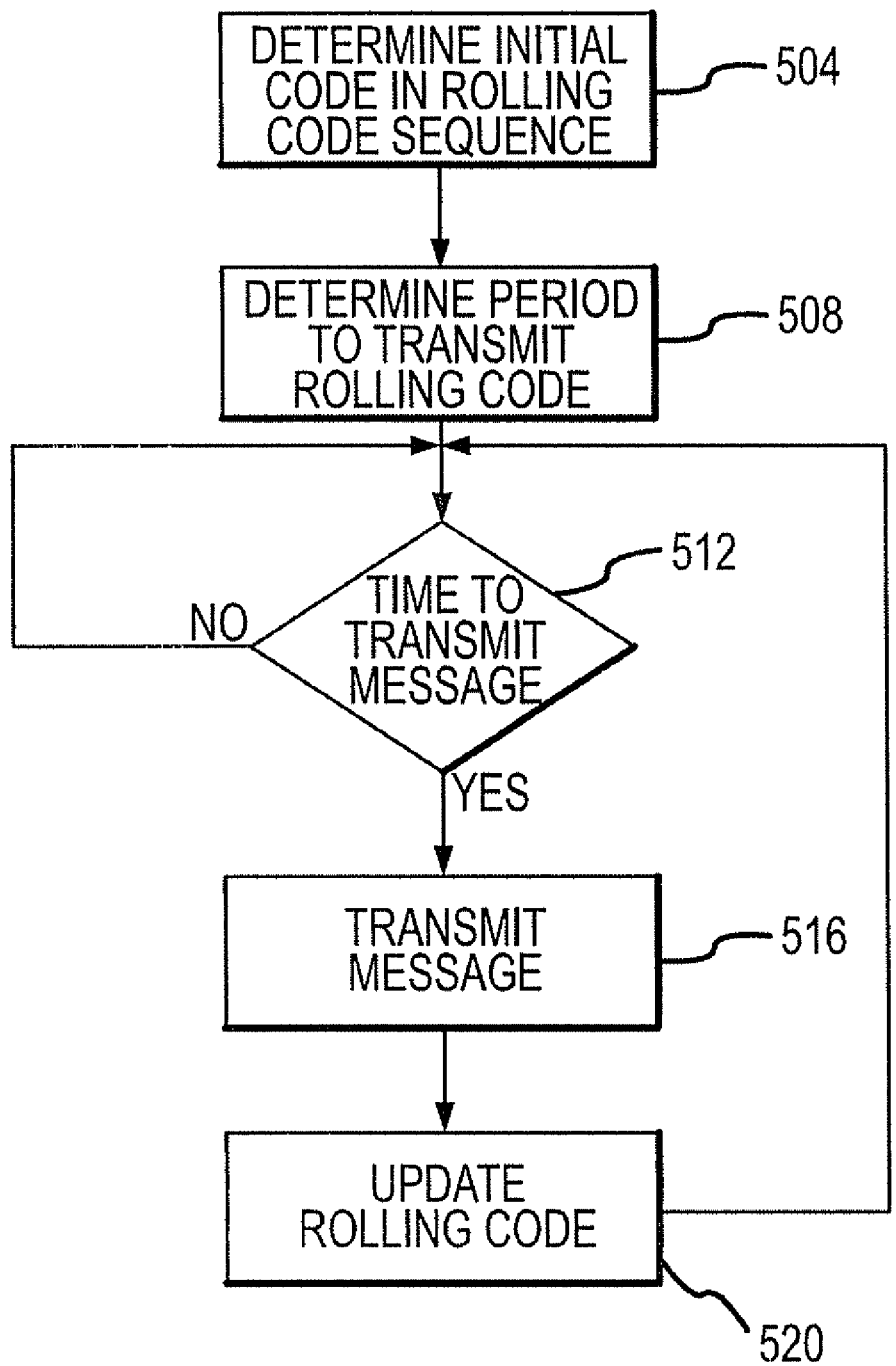
FIG. 5 is a flow chart depicting a method of transmitting a message in order to verify authenticity of downstream device to an upstream device in accordance with embodiments of the present invention.

Referring now to FIG. 5, a method of continually sending an update message from a unidirectional communications protocol device to an upstream device will be described in accordance with at least some embodiments of the present invention. Initially, the downstream device, for example a reader 112, will determine an initial code in the rolling code sequence (step 504). Then the upstream device determines the periodicity with which it needs to receive a valid code from a downstream device, for example a reader 112. Most of these determinations may be made upon installation of the reader 112 or may be based upon other synchronization techniques known in the art. A valid reader 112 is informed of the required check in period and determines how often it needs to transmit a valid code to the upstream device (step 508). The downstream device waits until it is time to send an update signal in step 512. If the required amount of time has not passed since the last update message, the downstream device continues to wait at step 512. Once it becomes time to transmit the message, the downstream device generates and transmits a message to the upstream device (step 516). The transmitted message contains the valid code in the rolling code sequence. The valid code is sent to the upstream device to verify to the upstream device that the downstream device is still operational. Once the downstream device has sent the message containing the valid rolling code, the downstream device updates to the next code in the rolling code sequence (step 520).

A downstream device may be required to send in an update signal every second or fraction of a second for example. Having such a short period between update signals may preclude an attacker from cutting the connection between the upstream device and the downstream device as any interruption in communication may be discovered due to the high frequency of required updates. However, in order to conserve bandwidth, a lower frequency of update may be required.

As noted above a reader 112, intermediate device 120, hub 108, or control panel 104 may be considered an upstream and/or downstream device depending on where it resides in relation to other devices in the system. A first control panel 104 may be connected to a master control panel. The first control panel 104 may be required to update its status to the master control panel in which case the first control panel 104 would be considered the downstream device and the master control panel would be considered the upstream device.

Figure 6:
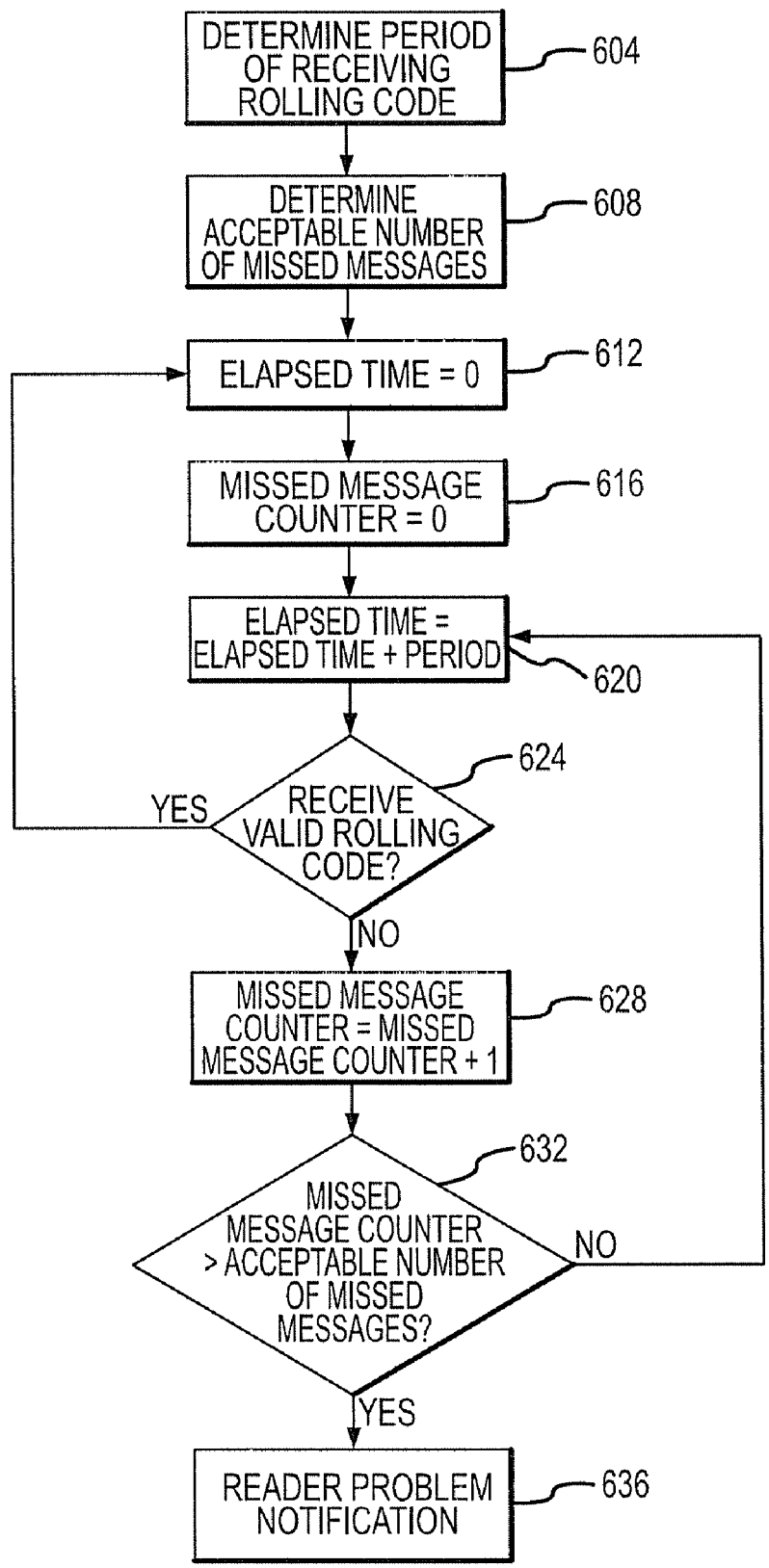
FIG. 6 is a flow chart depicting logic within an exemplary upstream device in order to verify the authenticity of downstream devices in a secure access system in accordance with embodiments of the present invention.

Referring now to FIG. 6 a method of ensuring that a downstream device is updated and valid will be described in accordance with at least some embodiments of the present invention. Initially, the period with which a downstream device is required to "check-in" is determined (step 604). Then, the number of acceptable missed messages or "check-ins" is determined (step 608). For a more secure system, the number of acceptable missed messages may be set to a very low number, i.e. zero, one, or two. In less secure systems the number of acceptable missed messages may be set higher, giving the system a higher tolerance to missed messages.

Once the required update rate and number of acceptable missed messages is determined, a variable representing elapsed time is set equal to zero (step 612). During this system initialization a variable representing the number of missed messages is set equal to zero (step 616). Then as time progresses the upstream device waits to receive a signal from a downstream device. When the predetermined amount of time between required updates has passed (step 620), the upstream device determines if it has received a valid rolling code (step 624). The upstream device may require the downstream device to "check-in" right on the required time. Alternatively, a downstream device may only be required to transmit a valid code once every period. In the latter configuration, if a downstream device sends a message in response to reading a credential and appends a valid rolling code with that message, the upstream device may not require another update message from the downstream device during that time span. However, if the upstream device does require the downstream device to transmit a valid rolling code on the required time, even if the downstream device already sent a message with a valid rolling code earlier in the time period, the downstream device will be required to transmit another valid rolling code at the predetermined time or in a predetermined time window.

If the upstream device does receive a valid rolling code at step 624 for that time period, then the method returns to step 612 and the variable representing elapsed time is set equal to zero. If the upstream device does not receive a valid rolling code (e.g. no check-in signal is received or the check-in signal included an invalid rolling code), then the variable representing the number of missed messages is incremented by one (step 628). In step 632, it is determined if the number of missed check-in messages is greater than the acceptable number of missed messages. If the threshold for missed check-in messages has not been realized, then the method returns to step 620 to wait for the next required check in time or time window. If the threshold for missed check-in messages has been exceeded then the upstream device determines that there is a problem with the downstream device, typically a reader, and performs the required steps to notify personnel that the subject downstream device is malfunctioning (step 636).

Referring now to FIG. 7, a data structure employed by both an upstream device and downstream device will be described in accordance with at least some of the embodiments of the present invention. The data structure may be in the form of a list of valid rolling codes or a rolling code sequence 700. The rolling code sequence 700 comprises a rolling code data field 704 and a required check in time field 708. One copy of the rolling code sequence 700 is maintained in the upstream device that will be determining the authenticity of a downstream device. The rolling code sequence 700 may alternatively be maintained in the database 144 and referenced by the upstream device when analyzing a message that includes a rolling code. In addition to maintaining the rolling code sequence 700 in the upstream device, the rolling code sequence 700 is maintained in the downstream device. This ensures that both the upstream and valid downstream device "agree" on a valid rolling code. The rolling code sequence 700 may be employed in a system 100 that utilizes a unidirectional protocol because substantive data typically cannot be sent from upstream device to the downstream device. Therefore, each device in the system 100 can utilize the rolling code sequence 700 to determine a valid rolling code without engaging in bilateral communications. In the event that a fraudulent reader not having the rolling code sequence 700 attempts to send a message to the upstream device, the upstream device will be able to determine that the downstream device is either fraudulent or malfunctioning.

The rolling code sequence 700 may comprise up to x rolling codes or rolling code generation variables that are required to be transmitted at a check in time up to k periods after the first check in time, where x and k are typically greater than one.

Each rolling code in the rolling code data field 704 may be a unique predetermined rolling code. Alternatively, an algorithm may use the data stored in the rolling code data field 704 in order to generate a valid rolling code. The upstream device will expect rolling code A from a downstream device at time T in order to determine the authenticity of the downstream device. Then at a time later than time T, the upstream device will expect rolling code B. Since a valid downstream device will have the rolling code sequence 700, it will know what rolling code to send and when to send it. A fraudulent reader on the other hand will not have access to the rolling code sequence 700 and thus will not be able to send a valid rolling code to the upstream device at the required time. This will result in the upstream device determining that the downstream device is not valid or is not functioning properly. A valid rolling code generally includes the next rolling code to be sent in the rolling code sequence. As can be appreciated, a less noise sensitive system may be created that identifies more than one rolling code as a valid rolling code. For example, an upstream device may accept the next rolling code up to X more rolling codes in the rolling code sequence. This valid rolling code buffer can be implemented to provide some level of resistance to one or more rolling codes being missed due to noise or other factors.

In an alternative configuration, a prompt signal may be sent from the upstream device to the downstream device asking for the next valid rolling code in the rolling code sequence 700. The prompting signal may be sent via the LED control signal in the case of the Wiegand protocol. When the prompt signal is received at the downstream device, the next rolling code is chosen in the sequence of rolling codes 700. This particular configuration is beneficial in that a predetermined period of reply does not necessarily need to be employed. Rather, a prompt signal may be sent randomly from an upstream device to a downstream device. In order for the downstream device to prove its authenticity to the upstream device, it should generate a valid rolling code and transmit it back to the upstream device.

As can be appreciated by one of skill in the art, the relationship of an upstream device and a downstream device is generally defined by the flow of credential information. The downstream device transmits credential information to an upstream device, which may further forward the information to another upstream device or analyze the information to determine an authenticity of the downstream device. Downstream devices are not limited to a reader 112, but rather may include an intermediate device 120, a credential 116, and/or a control panel 104. Moreover, upstream devices are not limited to control panels 104, but also may include a reader 112, an intermediate device 120, and/or a credential 116.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of maintaining a secure access system that uses a unidirectional communication protocol, the secure access system comprising at least one credential, at least one reader, and a device upstream of said reader, the method comprising:

reading a credential with a reader;
said reader generating a first message comprising credential data associated with said credential and a first code;
transmitting said first message to an upstream device;
said upstream device analyzing said credential data in order to determine the authenticity of said credential and further analyzing said first code in order to determine the authenticity of said reader;
receiving, at said reader, a prompting signal transmitted by said upstream device;
in response to receiving said prompting signal from said upstream device, said reader generating a second message comprising a second code, wherein said second code is different from said first code; and
transmitting, by said reader, said second message to said upstream device, wherein a first code selection algorithm is used to generate said first code, wherein said first code selection algorithm generates said first code based upon at least one of time of day, total operation time of said reader, a reader unique ID, number of cards read, and a reader manufacturer ID, wherein a second code selection algorithm is used to generate said second code, and wherein the first and second code selection algorithms are different.

2. The method of claim 1, further comprising:
receiving at said upstream device said second message; and
said upstream device analyzing said second code in order to determine the authenticity of said reader, wherein the first and second codes are maintaining in a list of rolling codes at the reader.

3. The method of claim 1, wherein said prompting signal is transmitted from said upstream device to said reader via an LED control signal.

4. The method of claim 3, wherein additional LED control signals are initiated by said upstream device on a random basis.

5. The method of claim 1, wherein said first message is encrypted by said reader prior to transmitting said first message to said upstream device and decrypted by said upstream device prior to analyzing said first message.

6. The method of claim 1, wherein said first code selection algorithm generates said first code based upon a number of messages previously transmitted from said reader to said upstream device.

7. The method of claim 1, wherein said first and second codes are unique codes chosen from a rolling code list.

8. The method of claim 7, further comprising:
said upstream device accessing a second list that corresponds to said rolling code list;
said upstream device comparing said first code to one or more valid codes from said second list;
determining that said first code matches a valid code; and
in response to said upstream device determining that said first code matches said valid code, said upstream device determining that the authenticity of said reader is valid.

9. The method of claim 1, wherein said transmitting utilizes a Wiegand protocol.

10. The method of claim 1, wherein said credential is machine readable and comprises at least one of an RFID device, a contact smart card, a contactless smart card, a proximity card, a magnetic stripe card, a barium ferrite card, a bar code, a Wiegand card, a PDA, and a cellular phone.

11. The method of claim 1, wherein credential data is at least one of a user name, a social security number, a title, access permissions, a key, a password, a manufacturer ID, site code, customer code, and a unique ID.

12. The method of claim 1, wherein said upstream device is at least one of a control panel, a host computer, a processor, a database, and an intermediate device.

13. The method of claim 1, wherein said reader comprises a second device that generates the codes.

14. The method of claim 13, wherein said second device is integral with a housing of said reader.

15. A method of maintaining a secure access system that uses a unidirectional communication protocol, comprising:
providing a downstream device associated with at least one interrogator device that is operable to transmit a rolling code from a first list of rolling codes as a part of a message;
providing an upstream device that is operable to receive said message and analyze said rolling code by accessing a second list of rolling codes which matches the first list of colling codes and then comparing the rolling code to a valid code from the second list of rolling codes;
requiring said downstream device to transmit a first message comprising a first valid rolling code at a first time;
prompting said downstream device to transmit a second message comprising a second valid rolling code at a second time, wherein said upstream device prompts said downstream device to transmit said second message by at least one of (i) transmitting a prompting signal to said downstream device via an LED control line and (ii) interrupting power supplied to the downstream device.

16. The method of claim 15, wherein at least one of said first and second is a window of time in which said downstream device is required to transmit said message.

17. The method of claim 15, wherein at least one of said first and second message is time stamped in order to verify to said upstream device that said at least one of said first and second message was transmitted at their respective required time.

18. The method of claim 15, further comprising, determining a required first and second time of check-in.

19. The method of claim 18, wherein at least one of said first and second time is before at least one of said required first and second time of check-in.

20. The method of claim 18, wherein at least one of said first and second time related is after at least one of said required first and second time of check in.

21. The method of claim 15, wherein in response to said downstream device not transmitting at least one of said first and second valid rolling codes, determining that said downstream device is at least one of fraudulent and malfunctioning.

22. The method of claim 15, wherein in response to said downstream device not transmitting said first rolling code, determining that said downstream device is at least one of fraudulent and malfunctioning.

23. The method of claim 22, wherein in response to determining that said downstream device is at least one of fraudulent and malfunctioning, performing an invalid reader logic action.

24. The method of claim 23, wherein said invalid reader logic action is at least one of sounding an alarm, notifying security/maintenance personnel that said downstream device is defective, not opening a door, and disabling said downstream device.

25. A secure access system utilizing a unidirectional communication protocol, comprising:
a credential;
a reader that is operable to read credential data from said credential upon presentation of said credential to said reader, generate a first message comprising some or all of said credential data and code data, and to transmit said first message;

an upstream device that is operable to receive said first message and upon receiving said first message is operable to analyze said credential data in order to determine the authenticity of said credential and to analyze said code data in order to determine the authenticity of said reader, wherein said upstream device is further operable to generate and transmit a prompting signal via an LED control line to said reader which requires the reader to transmit additional code data in a second message to confirm its authenticity to said upstream device, wherein the code data includes a rolling code selected from a list of rolling codes, wherein said rolling code is a unique code chosen from said list of rolling codes, wherein said upstream device is further operable to access a second list which matches said list of rolling codes, compare said rolling code to a valid code from said second list, determine that said first code matches said valid code, and in response to determining that said first code matches said valid code, determine that the authenticity of said reader is valid.

26. The system of claim 25, wherein said first message is encrypted by said reader prior to transmitting said first message to said upstream device and decrypted by said upstream device prior to analyzing said first message.

27. The system of claim 26, wherein a key is used to encrypt and decrypt said first message.

28. The system of claim 25, wherein a code selection algorithm is used to generate said rolling code.

29. The system of claim 28, wherein said code selection algorithm generates said rolling code based upon at least one of time of day, total operation time of said reader, a reader unique ID, and a reader manufacturer ID.

30. The system of claim 28, wherein said code selection algorithm generates said first code based upon the number of messages previously transmitted from said reader to said upstream device.

31. The system of claim 25, wherein said first message is transmitted by said reader utilizing a Wiegand protocol.

32. The system of claim 25, wherein said credential is at least one of an RFID device, magnetic stripe card, bar code, barium ferrite card, and smart card.

33. The system of claim 25, wherein said upstream device is an intermediate device.

34. The system of claim 25, wherein said upstream device is a control panel.

35. The system of claim 25, wherein the list of rolling codes and the second list are algorithmically generated.

36. A device for use in a secure access system that uses a unidirectional communication protocol, wherein said device is operable to read credential data from a credential, comprising:

a code generator that is operable to generate a first message comprising credential data associated with a credential that is used to determine the authenticity of said credential and a first code that is used to determine the authenticity of said device, wherein said code generator comprises a code selection algorithm, wherein said code selection algorithm generates said first code based upon at least one of time of day, total time of operation, a reader unique ID, and a reader manufacturer ID, wherein a second code selection algorithm is used to generate said second code;

an LED control input which connects said device to an upstream device, wherein said LED control input is used control an LED of said reader and to receive prompting signals from said upstream device which prompts said code generator to generate a second message comprising a second code; and an output for transmitting said first and second messages to said upstream device.

37. The device of claim 36, wherein said second code is different from said first code.

38. The device of claim 37, wherein said second message is generated a predetermined amount of time after said first message is generated and in response to receiving said prompting signal.

39. The device of claim 37, further comprising a power input.

40. The device of claim 36, wherein said first message is encrypted by said code generator prior to transmitting said first message to said upstream device.

41. The device of claim 36, wherein said code selection algorithm generates said first code based upon a number of messages previously transmitted from said device to said upstream device.

42. The device of claim 36, wherein said code selection algorithm changes in response to receiving said prompting signal from said upstream device.

43. The device of claim 36, wherein said code generator comprises a rolling code list.

44. The device of claim 43, wherein said code generator changes how the rolling code list is used in response to receiving said prompting signal from said upstream device.

45. The device of claim 44, wherein said prompting signal is transmitted randomly from said upstream device.

46. The device of claim 36, wherein said upstream device comprises a reader and wherein a credential comprises said code generator.

* * * * *